United States Patent
Wu et al.

(10) Patent No.: US 9,829,582 B2
(45) Date of Patent: Nov. 28, 2017

(54) METHOD AND APPARATUS FOR DIFFERENTIAL GLOBAL POSITIONING SYSTEM (DGPS)-BASED REAL TIME ATTITUDE DETERMINATION (RTAD)

(75) Inventors: Benjamin Wu, Yorba Linda, CA (US); Stephen R. Peck, West Hills, CA (US); Shuwu Wu, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 1114 days.

(21) Appl. No.: 13/236,575

(22) Filed: Sep. 19, 2011

(65) Prior Publication Data

US 2013/0069822 A1 Mar. 21, 2013

(51) Int. Cl.

| | |
|---|---|
| *G01S 19/55* | (2010.01) |
| *G01S 19/41* | (2010.01) |
| *G01S 19/49* | (2010.01) |
| G01S 19/44 | (2010.01) |
| G01S 19/04 | (2010.01) |
| G01S 19/07 | (2010.01) |
| G01S 19/53 | (2010.01) |

(52) U.S. Cl.
CPC .............. *G01S 19/55* (2013.01); *G01S 19/41* (2013.01); *G01S 19/49* (2013.01); *G01S 19/04* (2013.01); *G01S 19/07* (2013.01); *G01S 19/44* (2013.01); *G01S 19/53* (2013.01)

(58) Field of Classification Search
CPC .......... G01S 19/04; G01S 19/07; G01S 19/15; G01S 19/40; G01S 19/41; G01S 19/43; G01S 19/44; G01S 19/47; G01S 19/48; G01S 19/49; G01S 19/53; G01S 19/54; G01S 19/55

USPC .............. 342/357.23, 357.24, 357.3, 357.32, 342/357.36, 357.38, 357.44, 357.53
See application file for complete search history.

(56) References Cited

U.S. PATENT DOCUMENTS

| | | | |
|---|---|---|---|
| 5,471,218 A | | 11/1995 | Talbot et al. |
| 5,543,804 A | * | 8/1996 | Buchler et al. .......... 342/357.23 |
| 5,548,293 A | * | 8/1996 | Cohen .................... G01S 5/0009 342/352 |

(Continued)

FOREIGN PATENT DOCUMENTS

| | | |
|---|---|---|
| EP | 1729145 A1 | 12/2006 |
| EP | 2068165 A2 | 6/2009 |

(Continued)

OTHER PUBLICATIONS

Kalman; A New Approach to Linear Filtering and Prediction Problems; Transaction of the ASME—Journal of Basic Engineering; Mar. 1960; pp. 35-45.

(Continued)

*Primary Examiner* — Chuong P Nguyen

(57) ABSTRACT

A differential global positioning system (DGPS) processor can include an almost fixed integer ambiguity (AFIA) module for generating in real-time a multiple dimensional state vector of integer ambiguities and multiple dimensional corrections. The AFIA module can use double difference (DD) measurements for pseudo-range (PR) and carrier phase (CP) pairs generated from at least three global positioning system (GPS) receivers. A DGPS processor can be included in a high data rate real time attitude determination (RTAD) system to achieve high heading accuracy with high integrity.

17 Claims, 4 Drawing Sheets

(56) References Cited

U.S. PATENT DOCUMENTS

| | | | |
|---|---|---|---|
| 5,554,994 A | | 9/1996 | Schneider |
| 5,561,432 A | * | 10/1996 | Knight .................... G01S 19/54 |
| | | | 342/357.31 |
| 5,702,070 A | | 12/1997 | Waid |
| 5,916,300 A | | 6/1999 | Kirk et al. |
| 5,929,807 A | | 7/1999 | Viney et al. |
| 5,933,110 A | * | 8/1999 | Tang et al. ............... 342/357.37 |
| 5,936,573 A | | 8/1999 | Smith |
| 5,991,691 A | | 11/1999 | Johnson |
| 6,061,631 A | * | 5/2000 | Zhang .......................... 701/470 |
| 6,088,653 A | * | 7/2000 | Sheikh ................. G01C 21/165 |
| | | | 701/4 |
| 6,157,891 A | | 12/2000 | Lin |
| 6,204,806 B1 | | 3/2001 | Hoech |
| 6,208,239 B1 | | 3/2001 | Muller et al. |
| 6,281,836 B1 | | 8/2001 | Lupash et al. |
| 6,369,755 B1 | | 4/2002 | Nichols et al. |
| 6,424,915 B1 | * | 7/2002 | Fukuda et al. ................ 701/470 |
| 6,466,846 B2 | | 10/2002 | Maynard |
| 6,480,789 B2 | | 11/2002 | Lin |
| 6,675,095 B1 | | 1/2004 | Bird et al. |
| 6,697,736 B2 | | 2/2004 | Lin |
| 6,727,849 B1 | | 4/2004 | Kirk et al. |
| 6,732,051 B1 | | 5/2004 | Kirk et al. |
| 6,753,810 B1 | | 6/2004 | Yang et al. |
| 6,792,380 B2 | * | 9/2004 | Toda ............................. 702/151 |
| 6,816,117 B2 | | 11/2004 | Fink et al. |
| 6,847,893 B1 | | 1/2005 | Lupash |
| 6,856,905 B2 | | 2/2005 | Pasturel et al. |
| 6,970,785 B2 | | 11/2005 | Derambure et al. |
| 7,205,939 B2 | | 4/2007 | Zimmerman |
| 7,219,013 B1 | | 5/2007 | Young et al. |
| 7,292,185 B2 | * | 11/2007 | Whitehead et al. ..... 342/357.36 |
| 7,310,062 B1 | | 12/2007 | Hwang |
| 7,355,549 B2 | | 4/2008 | Fukuda et al. |
| 7,411,545 B2 | * | 8/2008 | Dutton ..................... 342/357.27 |
| 7,436,354 B2 | | 10/2008 | Lee |
| 7,460,065 B2 | | 12/2008 | Ogawa et al. |
| 7,711,482 B2 | | 5/2010 | Coatantiec et al. |
| 7,768,451 B2 | | 8/2010 | Wu et al. |
| 7,855,678 B2 | * | 12/2010 | Scherzinger et al. ... 342/357.23 |
| 7,868,820 B2 | * | 1/2011 | Kolb ........................ G01S 19/04 |
| | | | 342/357.26 |
| 7,987,049 B2 | * | 7/2011 | Hayashi et al. .............. 701/472 |
| 8,019,539 B2 | | 9/2011 | Vanderwerf |
| 8,271,194 B2 | | 9/2012 | Whitehead et al. |
| 8,570,217 B2 | | 10/2013 | Oehler |
| 8,610,623 B2 | | 12/2013 | Trautenberg |
| 8,779,967 B2 | | 7/2014 | Jones et al. |
| 8,898,011 B2 | | 11/2014 | Peck et al. |
| 8,949,011 B2 | | 2/2015 | Ford et al. |
| 9,173,337 B2 | * | 11/2015 | Guyette .................. G01S 19/54 |
| 2003/0112177 A1 | * | 6/2003 | Toda ....................... G01S 19/44 |
| | | | 342/357.27 |
| 2003/0117317 A1 | | 6/2003 | Vanderwerf et al. |
| 2003/0154049 A1 | | 8/2003 | Toda |
| 2005/0012660 A1 | | 1/2005 | Nielsen et al. |
| 2006/0114157 A1 | | 6/2006 | Kolanek et al. |
| 2007/0075896 A1 | | 4/2007 | Whitehead et al. |
| 2008/0084348 A1 | | 4/2008 | Vacher |
| 2008/0129586 A1 | | 6/2008 | Martin |
| 2008/0297408 A1 | | 12/2008 | Dai et al. |
| 2009/0027262 A1 | | 1/2009 | Wu et al. |
| 2009/0222204 A1 | | 9/2009 | Roberts et al. |
| 2009/0284258 A1 | | 11/2009 | Morrison et al. |
| 2010/0278013 A1 | | 11/2010 | Holmes et al. |
| 2011/0181463 A1 | | 7/2011 | Chopard et al. |
| 2011/0291887 A1 | | 12/2011 | Pulford |
| 2013/0050020 A1 | | 2/2013 | Peck et al. |
| 2013/0069822 A1 | | 3/2013 | Wu et al. |
| 2014/0197988 A1 | * | 7/2014 | Teunissen ............... G01S 19/54 |
| | | | 342/357.39 |

FOREIGN PATENT DOCUMENTS

| | | |
|---|---|---|
| EP | 2244097 A1 | 10/2010 |
| WO | WO 2004/031797 A1 | 4/2004 |

OTHER PUBLICATIONS

McGraw; Generalized Divergence-Free Carrier Smoothing with Applications to Dual Frequency Differential GPS; ION NTM; Jan. 2006.

Misra et al; Global Positioning System: Signals, Measurements, and Performance, 2$^{nd}$ Ed.; Ganga-Jamuna Press; 2006.

Teunissen; The Least-Squares Ambiguity Decorrelation Adjustment: A Method for Fast GPS Integer Ambiguity Estimation; Journal of Geodesy; 1995; pp. 65-82; vol. 70.

Teunissen; GNSS Ambiguity Bootstrapping: Theory and Application; Int. Symposium on Kinematic Systems in Geodesy, Geomatics, and Navigation; Banff, Canada; Jun. 5-8, 2001.

Teunissen et al; A Probabilistic Evaluation of Correct GPS Ambiguity Resolution in Proc. of the 11$^{th}$ Int. Tech. Meeting of the Satellite Div. of the Institute of Navigation; ION GPS; 1998; Nashville, TN; Sep. 15-18, 1998; pp. 1315-1323.

Wu et al.; Geometry Extra-Redundant Almost Fixed Solutions: A High Integrity Approach for Carrier Phase Ambiguity Resolution for High Accuracy Relative Navigation; IEEE/ION PLANS; May 2008.

Giorgi; et al.; "Enhancing the Time-To-Fix for the Unaided Single-Frequency Integer Ambiguity Resolution in GNSS Attitude Determination Applications"; Position Location and Navigation Symposium (plans) ; 2010, IEEE/ION; IEEE, Piscataway, NJ, USA; May 4, 2010, pp. 236-244, XP031706983; ISBN: 978-1-4244-5036-7; section II; p. 236-237.

Bo Wang et al.; "A motion-based integer ambiguity resolution method for attitude determination using the global positioning system (GPS)"; Measurement Science and Technology; doi: 10.1088/0957-0233/21/6/065102; IOP Publishing; 2010.

Enge et al., Local Area Augmentation of GPS for the Precision Approach of Aircraft, Jan. 1999, pp. 111-132, vol. 87, No. 1, IEEE, United States of America.

Henkel et al., Integrity Analysis of Cascaded Integer Resolution with Decorrelation Transformations, Proceedings of the 2007 National Technical Meeting of the ION, Jan. 22-24, 2007, pp. 903-910, San Diego, California.

Khanafseh et al., A New Approach for Calculating Position Domain Integrity Risk for Cycle Resolution in Carrier Phase Navigation Systems, Oct. 2008, 11 pages, IEEE, United States of America.

Khanafseh et al., H1-Integrity of Carrier Phase Navigation Algorithms Using Multiple Reference Receivers, Proceedings of the National Technical Meeting —Institute of Navigation, 2009, 12 pages.

Lee, A New Improved RAIM Method Based on the Optimally Weighted Average Solution (OWAS) Under the Assumption of a Single Fault, Proc. Of the ION National Technical Meeting, Jan. 19, 2006, 13 pages.

Rife et al., Core Overbounding and its Implications for LAAS Integrity, 17$^{th}$ International Technical Meeting of the Satellite Division ION GNSS, Sep. 2004, 12 pages.

Sayim et al., Overbounding Non-zero Mean Gaussian Ranging Error for Navigation Integrity of LAAS, Proceedings of 2$^{nd}$ International Conference on Recent Advances in Space Technologies, Jun. 9-11, 2005, pp. 404-410, IEEE, United States of America.

Teunissen, Statistical GNSS Carrier Phase Ambiguity Resolution: A Review, 2001, 9 pages, IEEE, United States of America.

Walter et al., Weighted RAIM for Precision Approach, Proceedings of the ION GPS, 1995, 10 pages.

EP Search Report for EP Application No. 12184868.3, dated Feb. 20, 2013, 9 pages.

International Search Report for International Application No. PCT/US2013/050090 dated Oct. 4, 2013, 12 pages.

* cited by examiner

METHOD AND APPARATUS FOR DIFFERENTIAL GLOBAL POSITIONING SYSTEM (DGPS)-BASED REAL TIME ATTITUDE DETERMINATION (RTAD)

GOVERNMENT LICENSE RIGHTS

This invention was made with Government support under contract N00019-16-C-0052 awarded by the Naval Air Systems Command. The Government has certain rights in this invention.

BACKGROUND

Satellite navigation systems, such as the global positioning system (GPS), enable a receiver to determine a location from ranging signals received from a plurality of satellites. The ranging signals can be broadcasted on frequencies, such as the L1 signal (1.57542 gigahertz [GHz]) and/or L2 signal (1.2276 GHz). L1 can have a wavelength of about 19 centimeters (cm) and L2 can have a wavelength of about 24 cm. Position can be determined from code and/or carrier phase information. A code division multiple access (CDMA) code is transmitted by the GPS satellites to the receiver and correlated with replica codes to determine ranges to different satellites. Accuracy can be enhanced using real-time kinematic (RTK) processing of carrier phase information. Accuracy at the level of tens of centimeters is possible with RTK carrier phase integer ambiguity resolution. RTK carrier phase integer ambiguity resolution can be used in applications with very accurate positional location information requirements and high integrity requirements.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
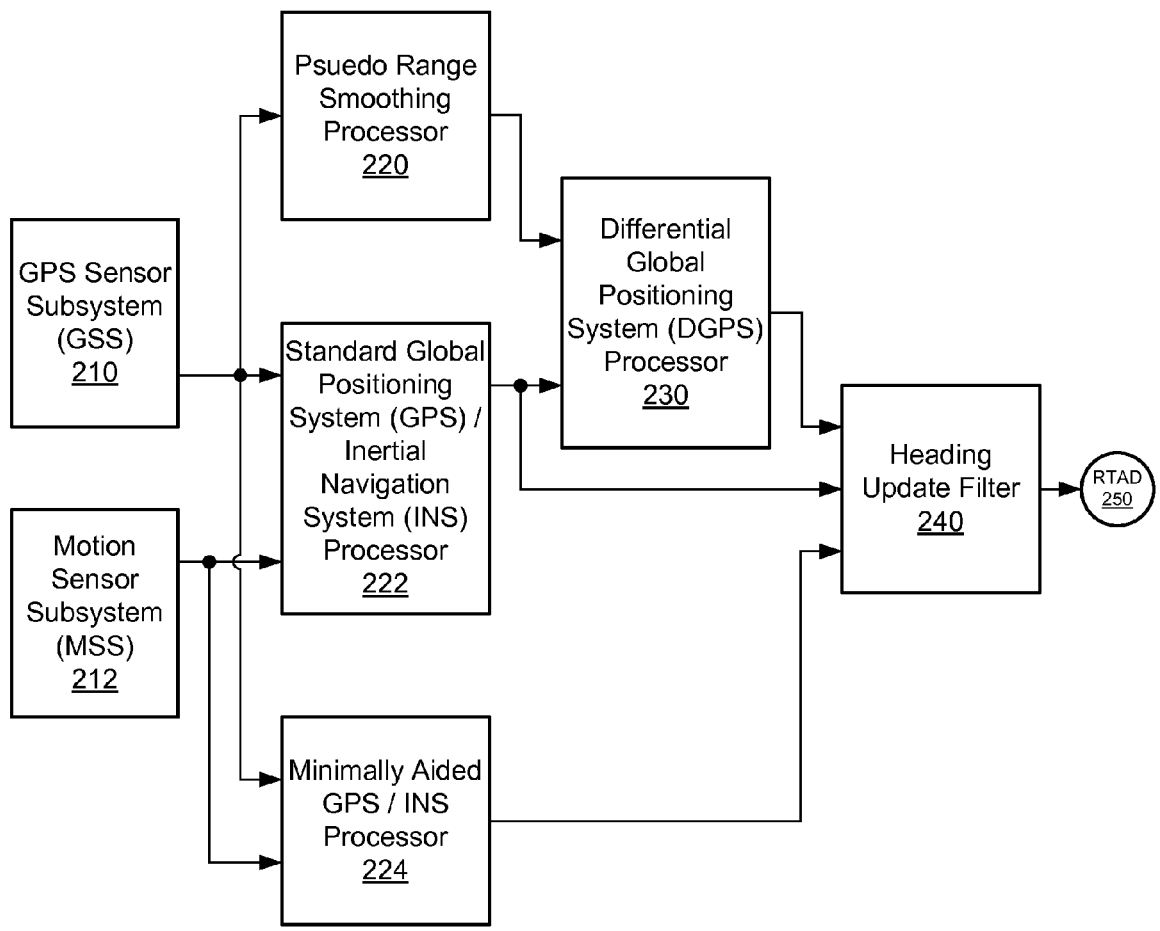
FIG. 1 illustrates a block diagram of a real time attitude determination system in accordance with an example of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly, but is not intended to necessarily identify key features or essential features of the technology; nor is it intended to limit the scope of the claimed subject matter. However, the initial summary should not be considered limiting, and may contribute to the enabling disclosure of the present invention and support of the appended claims.

Real time determination of rotational motion relies on global positioning system (GPS) and inertial measurements. The three rotational angles, roll, pitch and yaw (or heading), can be determined by blending GPS measurements with gyroscope and accelerometer measurements. Due to presence of the Earth's gravity, roll and pitch can be determined to an accuracy of about 0.025 milliradians in a high quality inertial navigation system. However, heading accuracy may be around 1 to 2 milliradians for a navigation system that experiences low dynamics. A differential GPS-based processor may use high integrity carrier phase integer ambiguity resolution to achieve heading accuracy on the order of 0.05 milliradians, which can be more than 20 times better than the 1 to 2 milliradians currently achieved. The differential GPS (DGPS) processor can achieve high accuracy in heading as well as high integrity assurance suitable for safety-of-life applications. A DGPS processor along with GPS/inertial navigation processor can be included in a high data rate real time attitude determination (RTAD) system to achieve ultra-high heading accuracy with high integrity. In flight dynamics, attitude can be defined as an object's orientation about its center of mass.

Exemplary embodiments of the present invention can provide various advantages, including, but not limited to, providing accurate DGPS-based attitude determination that can be utilized for high accuracy and integrity (e.g., for automatic landing of aircrafts on a carrier), providing accurate heading information that can be used or integrated into other systems (e.g., weapon systems), providing truth attitude data for moving objects (e.g., ship or aircraft), and being utilized for fine alignment of inertial navigation/measurement units during installation.

The RTAD system can include a GPS sensor subsystem (GSS) 210, a motion sensor subsystem (MSS) 212, a pseudo range smoothing processor 220, a standard GPS and inertial navigation system (INS) processor 222, a minimally aided GPS and INS processor 224, a DGPS processor 230, and a heading update filter 240 to generate a RTAD 250, as illustrated in FIG. 1. The GSS can include at least three dual frequency GPS sensors with carrier phase (CP) tracking capability to provide GPS measurement data at least a 1 or 2 hertz (Hz) rate. GPS sensors with co-linear locations relative to each other (namely all on one same line) may have reduced accuracy and/or integrity. The MSS can include at least one inertial measurement unit (IMU) sensor that provides inertial measurement data, such as at 100 Hz rate. A GSS output can be an input into a pseudo range smoothing processor. The GSS output and a MSS output can be an input for the standard GPS and INS processor and the minimally aided GPS and INS processor. The standard GPS and INS processor can use a full inertial filter (FIF) to combine GPS sensor data with IMU data for a continuous heading at a high rate of at least 100 Hz. The minimally aided GPS and INS processor can provide an average heading using a low authority inertial filter (LAIF) to combine GPS sensor data with IMU data.

DGPS processor can generate an attitude at a lower rate of at least 1 Hz using an almost fixed integer ambiguity module for high integrity CP integer ambiguity resolution. The attitude of the DGPS processor can be sampled and referred to as periodic attitude data since the attitude is generated at a lower rate than the GPS and INS processors (standard and minimally aided). The heading update filter can blend the DGPS processor heading estimate with the minimally aided GPS and INS processor data to generate a final heading estimation. The heading update filter can generate a real time attitude determination (RTAD) at high rate of at least 100 Hz by combining the heading estimation of the DGPS processor with IMU data from the GPS and INS processor. The IMU data can be used to maintain continuity of the attitude and heading estimation between sampling of the periodic attitude data.

The DGPS processor 230 can include a data selection module 320, a line-of-sight (LOS) module 330, a single difference (SD) module 340, a double difference (DD) module 350, an almost fixed integer ambiguity (AFIA) module 360, and an attitude module 370 to generate attitude data 380.

The data selection module can receive GPS data 310 and GPS-aided navigation data 312 and select observable GPS data for at least three GPS receivers (or sensors). The GPS-aided navigation data can combine the GPS data of each GPS receiver with IMU data.

The LOS module can generate a LOS unit vector for each GPS receiver from the observable GPS data for GPS satellites in view of the GPS receivers.

The single difference (SD) module can generate at least two single difference observables. A single difference observable can be the difference between two receiver observables where a receiver observable can include observable GPS data or a LOS unit vector for each receiver.

The double difference (DD) module can generate at least two double difference observables. The double difference observable can be the difference between SD observables of two GPS satellites.

The AFIA module can generate in real-time a multiple dimensional state vector of integer ambiguities and multiple dimensional corrections using DD measurements for pseudo-range (PR) and carrier phase (CP) pairs generated from at least three global positioning system (GPS) receivers (or sensors).

Figure 3:
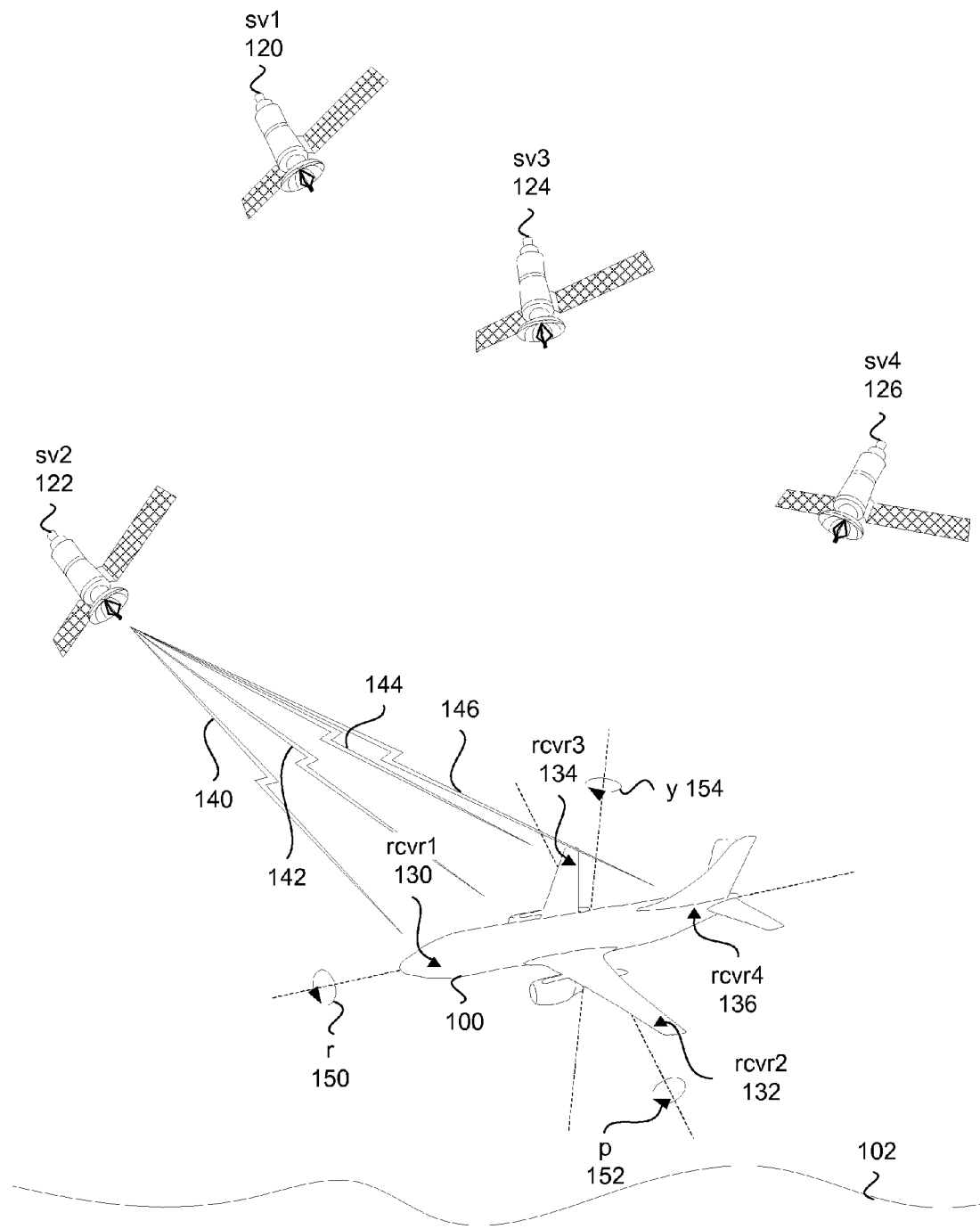
FIG. 3 illustrates a diagram of a plurality of global positioning system (GPS) satellites and a plurality of GPS receivers rigidly fixed on an object in accordance with an example of the present invention.

The attitude module can generate an attitude from the multiple dimensional state vector of the AFIA module. The multiple dimensional corrections can include at least two dimensions, such as positions or angles. The multiple dimensional corrections can include angle corrections for a set of angles that include at least two of roll, pitch, and yaw angles. The GPS receivers can be rigidly fixed in known positions relative to each other on an object, such as a ship or an aircraft. FIG. 3 illustrates an example of four GPS receivers 130, 132, 134, and 136 rigidly fixed on an airplane 100.

A more detailed explanation of the RTAD system, the DGPS processor, and the method for determining attitude data in real time is provided below. Relevant differential GPS and inertial navigation technology is briefly reviewed. In ship and air navigation, determining three dimensional (3D) position as well as 3D rotational motion can be useful. 3D rotational motion can be characterized by three Euler angles known as roll 150, pitch 152, and yaw 154 (also known as heading angle), as illustrated in FIG. 3. In the body frame of reference (or from the perspective of the airplane 100 in FIG. 3), roll can be defined as rotation around the forward direction, pitch can be defined as rotation around rightward direction, and yaw (or heading) can be defined as rotation around downward direction. An inertial measurement unit (IMU) can consist of an accelerometer and gyroscope which measure changes in velocity (dV) and rotational angles (di) at high data rates (e.g., 100 Hz). A high quality navigation-grade IMU can detect accelerations as small as 25 micro-G (25/1,000,000 of a gravitational force), hence presence of earth gravity allows roll and pitch angles to be determined to accuracy about 0.025 milliradians. The G-force (or gravitational force) is an object's acceleration relative to free-fall. As a radian is the ratio between the length of an arc and a radius of the arc, the magnitude in radians of one complete revolution (360 degrees) is the length of the entire circumference divided by the radius (i.e., $2\pi r/r$ or $2\pi$). $2\pi$ radians is equal to 360 degrees, meaning that one radian is equal to $180/\pi$ degrees.

Unlike roll 150 and pitch 152, heading (or yaw) 154 is due to an object's rotation around the downward direction. When an object, such as a ship, moves on the ocean surface, the Earth's gravity may causes little to no torque for rotation of the object's heading angle. Instead, the object may rely on the object's own motion dynamics or a much weaker earth rotation induced acceleration for measuring heading (yaw) angle, which can lead to an accuracy of about 1 or 2 milliradians, or about two orders of magnitude worse in accuracy than that for roll or pitch angles.

Although an IMU can measure changes in velocity and rotational angles, an IMU can have measurement bias and instability that causes the IMU measurement to drift over time. Bias can be the difference between an estimation of a parameter and the true value of the parameter being estimated. A biased measurement can have measurement ambiguity and an unbiased measurement can be an absolute measurement. An unaided inertial measurement system (IMS) can eventually lead to large errors because of drift. The problem of drifting can be readily addressed by having periodic updates with GPS measurements at a slower rate, such as 1 or 2 Hz.

The GPS and inertial measurements can be blended together using a filter for handling noise and other inaccuracies, such as a Kalman filter. With measurements observed over time containing noise, random variations, and other inaccuracies, the Kalman filter can generate values that tend to be closer to the true values of the measurements and their associated calculated values. The Kalman filter can produce estimates of the true values of measurements and their associated calculated values by predicting a value, estimating the uncertainty of the predicted value, and computing a weighted average of the predicted value and the measured value. The most weight can be given to the value with the least uncertainty. The estimates produced by the method tend to be closer to the true values than the original measurements because the weighted average has a better estimated uncertainty than either of the values that went into the weighted average. An inertial navigation system (INS) can be a system for combining the GPS and inertial measurements, which can be employed for ship and aircraft navigation.

The differential GPS (DGPS) processor in a RTAD system can improve the poor heading accuracy of an INS and bring the heading accuracy, or yaw, to be on par with the accuracy of roll and pitch. A Global Positioning System (GPS) operates on the principle of geometric triangulation. With ranging measurements from at least three GPS satellites, a user's position on or near earth's surface can be determined. Using at least four GPS satellites can improve accuracy. A differential GPS (DGPS) processor allows accurate relative positioning between a reference object and a user. The DGPS processor operates by differencing the GPS ranging measurements between a reference and a user receiver to determine the relative position. The RTAD system can utilize dual frequency GPS receivers with carrier phase (CP) tracking along with pseudo range smoothing, CP real time kinematic (RTK) positioning, and geometry extra-redundant almost fixed solutions (GERAFS). Pseudo range smoothing, such as divergence-free carrier smoothing (DFS), can provide significant attenuation of pseudo-range (PR) and multipath noise without incurring additional errors due to the effects of ionospheric divergence. Carrier phase RTK positioning provides high accuracy relative positioning. The GERAFS provides high integrity assurance in CP integer ambiguity resolution as shown and described in U.S. Pat. No. 7,768,451 to Wu et al., which is herein incorporated by reference in its entirety. High accuracy positioning can use reliable methods, such as GERAFS, to resolve CP integer-cycle ambiguities.

The GERAFS approach can provide at least centimeter level positioning accuracy with high integrity suitable for safety critical applications. CP integer ambiguity resolution can be used for high accuracy attitude determination with high integrity.

As previously shown, FIG. 1 illustrates an example system block diagram of the present invention high accuracy real time attitude determination (RTAD) system. The RTAD system can include the GPS sensor subsystem (GSS) 210, motion sensor subsystem (MSS) 212, a pseudo range smoothing processing subsystem, a standard GPS and INS processing subsystem, a minimally aided GPS and INS processing subsystem, a DGPS-based high accuracy attitude determination subsystem, and a heading update filter estimator subsystem.

The GSS 210 can include at least three dual frequency GPS sensors with carrier phase (CP) tracking capability to provide GPS measurement data at least a 1 or 2 Hz rate. The location of the GPS sensors may not be co-linear with each other (namely all on one same line). An output of the GSS can be an input for the pseudo range smoothing processing subsystem, the standard GPS and INS processing subsystem, and the minimally aided GPS and INS processing subsystem.

The MSS 212 can include at least one inertial measurement unit (IMU) sensor that provides inertial measurement data (e.g., at 100 Hz rate). An output of the MSS can be an input for the standard GPS and INS processing subsystem, and the minimally aided GPS and INS processing subsystem.

The PR smoothing processing subsystem or the PR smoothing processor 220 can be used to smooth the PR measurements of GPS raw receiver data with the CP measurements to generate GPS receiver data. The PR smoothing processor can estimate a CP bias for a smoothing interval and add the CP bias to the CP to generate a smoothed unbiased measurement. The PR smoothing processor can include a single frequency smoothing processor, an iono-free smoothing processor, a divergence free smoothing (DFS) processor, or combination of these processors. The bias measurement can have measurement ambiguity where an unbiased measurement is an absolute measurement. PR measurements can be noisy, where as an absolute measurement (or unbiased measurement) may reduce or eliminate the noise. CP measurements can have little noise relative to PR measurement, such as about 100 times less than PR, but CP measurements have an unknown bias. By smoothing the PR with CP data, the unknown CP bias can be determined. A longer smoothing interval can improve the accuracy of determining the unknown CP bias. By adding the estimated bias back to the phase measurement, an unbiased measurement or smoothed measurement can be formed with less noise than raw or unsmoothed PR measurements.

Smoothed PR measurements can assist the integrity ambiguity solving of a GERAFS method and/or a RTAD method. Many smoothing methods can be used, such as single frequency smoothing, an iono-free smoothing, a divergence free smoothing, etc. Single frequency smoothing can obtain PR and CP from one frequency, such as L1. The single frequency smoothing can have some challenges due to ionospheric issues. For example, if the ionosphere is changing over time, the estimated bias can be corrupted proportional to the temporal iono gradient and the smoothing time. If the iono is changing in space, the change can impact the double difference measurement between two points in space (proportional to baseline, and the spatial iono gradient). Single frequency smoothing can have low noise for the same smoothing period, but longer periods can generate integrity issues related to iono gradients.

Iono free smoothing can use a combination of both frequencies, such as L1 and L2, for PR and CP which can eliminate or reduce an error due to ionosphere. Although iono free smoothing can reduce sensitivity to temporal or spatial gradients, the noise from the PR combination can have three times the noise of single frequency smoothing. The reduced sensitivity to temporal or spatial gradients allows for various length smoothing times to reduce combinational noise, which can be useful in surveying and post processing applications where the interval time has less impact relative to real time application.

Divergence free smoothing (DFS) can use a single PR measurement, such as L1, and a combination of CP measurements, such as L1 and L2 from the same satellite, that have the same range and iono dependency as the PR measurement. DFS, like iono free smoothing, can have reduced or no temporal iono gradient sensitivity, so smoothing can have a long smoothing interval, but DFS has the lower noise characteristics like as single frequency smoothing. DFS can have an iono spatial gradient dependency, but can be reduced relative to the single frequency smoothing, thus DFS can provide good results for real time attitude determination. When the length of a time interval is not a factor, iono free smoothing can provide accurate and smooth PR measurements.

The standard GPS and INS processing subsystem or the standard GPS and INS processor 222 can use a full inertial filter (FIF) to combine GPS sensor data with IMU data for a continuous heading at a high rate of at least 100 Hz.

The minimally aided GPS and INS processing subsystem or the minimally aided GPS and INS processor can provide an average heading using a low authority inertial filter (LAIF) to combine GPS sensor data with IMU data at a high rate of at least 100 Hz.

A DGPS-based high accuracy attitude determination subsystem or DGPS processor can generate an attitude at a lower rate of at least 1 Hz by using an AFS method or the almost fixed integer ambiguity (AFIA) module for high integrity CP integer ambiguity resolution. The DGPS processor is discussed in greater detail below and shown in FIG. 2.

A heading update filter estimator subsystem or heading update filter 240 (FIG. 1) can blend the DGPS processor heading estimate with the minimally aided GPS and INS processor data to generate a final heading estimation. The heading update filter can generate a high accuracy real time attitude determination (RTAD) 250 at high rate of at least 100 Hz by combining the heading estimation of the DGPS processor with IMU data from the GPS and INS processor. The IMU data can be used to maintain continuity of the attitude and heading estimation between sampling of the periodic attitude data. The heading update filter can include a two state heading filter for correcting an average heading from a low authority inertial filter (LAIF) of an inertial measurement unit with the periodic attitude data and generating a two state heading filter output. The heading update filter can include a multiplexer for combining the two state heading filter output with the GPS-aided navigation data from a full inertial filter (FIF) of the inertial measurement unit.

In another example, the heading update filter 240 can incorporate heading information from an inertial solution, such as a GPS and INS processor, and RTAD processing. The estimator of the heading update filter can generate a heading correction (and heading rate correction) to an "almost free" inertial filter state. The estimator can use the average of the (LAIFs) which were computed for the inertial solution (or IMU solution).

The heading update filter can generate the RTAD in two operations. A first operation can use a two-state heading filter to correct the LAIF estimates from a minimally aided GPS and INS processor with the attitude heading generated by the DGPS processor. A second operation can incorporate the full inertial filter solution (FIF) of a standard GPS and INS processor with the two-state heading filter output. The heading update filter can maintain the integrity of the RTAD and full inertial solutions, while providing the accuracy of the RTAD process along with the continuity of the full inertial solution, which can maintain accuracy between the RTAD updates. By making the states updates (or attitude corrections) to the LAIF estimates (which estimates can have a very smooth, but slowly changing relatively large heading error), the full information from the two types of attitude solutions (FIF and RTAD) can be persevered.

Figure 2:
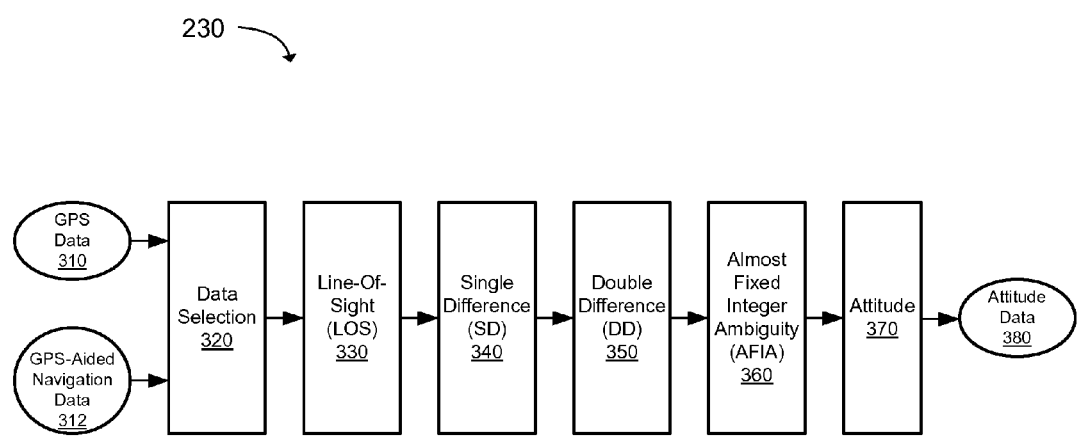
FIG. 2 illustrates a block diagram of a differential global positioning system (DGPS) processor in accordance with an example of the present invention.

FIG. 2 illustrates an example of the DGPS processor block in FIG. 1. FIG. 2 provides an example depiction of the internal workings of DGPS-based attitude determination. The DGPS processor 230 can include a data selection module 320, a line-of-sight (LOS) module 330, a single difference (SD) module 340, a double difference (DD) module 350, an almost fixed integer ambiguity (AFIA) module 360, and an attitude module 370 to generate attitude data 380.

The data selection module can receive GPS data 310 and GPS-aided navigation data 312 and select observable GPS data for at least three GPS receivers (or sensors). The GPS-aided navigation data can be a combination of the GPS data of each GPS receiver with IMU data. The data selection module can receive GPS receiver data from at least three GPS receivers. The LOS module can generate a LOS unit vector for each GPS receiver from the observable GPS data for GPS satellites in view of the GPS receivers. The single difference (SD) module can generate at least two pairs of single difference observables for PR and CP among the at least three GPS receivers. A single difference observable can be the difference between two receiver observables where a receiver observable can include observable GPS data or a LOS unit vector for each receiver. The double difference (DD) module can generate at least two sets of double difference observables from the two pairs of SD observables. The double difference observable can be the difference between SD observables of two GPS satellites. The double difference measurements can use a CP measurement for carrier frequency including a single frequency (i.e., L1 or L2) or a narrow-lane (NL) frequency, where NL frequency (i.e., L1+L2) sums at least two CPs measurements together. A number of single difference observables and a number of double difference observables can be one less than a number of GPS receivers used to generate observable GPS data. The AFIA module can generate in real-time a multiple dimensional state vector of integer ambiguities and multiple dimensional corrections using DD measurements for pseudo-range (PR) and carrier phase (CP) sets (or pairs) generated from at least three global positioning system (GPS) receivers (or sensors). The AFIA module can perform AFS integer ambiguity resolution, compute an associated observation matrix for attitude, set up a system of equations, and/or a multiple dimensional state vector, including attitude and fixed DD CP integer ambiguities. The AFIA module generates a multiple dimensional observation matrix for at least two PR and CP measurement pairs. The attitude module can generate an attitude from the multiple dimensional state vector of the AFIA module. The attitude can be used to generate a RTAD output.

The multiple dimensional corrections can include at least two dimensions, such as positions or angles. The multiple dimensional corrections can include angle corrections for a set of angles that include at least two of roll, pitch, and yaw angles.

The GPS receivers can be rigidly fixed in known positions relative to each other on an object, such as a ship or an aircraft. FIG. 3 illustrates an example of four GPS receivers 130, 132, 134, and 136 rigidly fixed on an airplane 100.

The minimally GPS-aided inertial navigation solution, such as the minimally aided GPS and INS processor (224 of FIG. 1) can be a free-running inertial solution with a very low gain for GPS-aiding so that the resulting navigation solution does not drift too far from truth. Given the minimally GPS-aided inertial navigation solution near unaided nature, the navigation solution can be very smooth in time. When blended with the highly accurate DGPS-derived heading estimate of the DGPS processor, the resulting heading estimate can be both very accurate and smooth in time.

In another example, the DGPS-based attitude determination of the DGPS processor can be represented mathematically. Two types of GPS observables from ith receiver to jth satellite can include pseudo-range (PR) observables $\rho_i^j$ represented by Equation 1, shown below, and carrier phase (CP) observables $\phi_i^j$ represented by Equation 2, shown below, where: $r_i^j$ is the line-of-sight (LOS) distance from ith receiver to jth satellite, $N_i^j$ is the ith receiver to jth satellite carrier phase integer ambiguity, $\partial t_{rcvr,i}$ is the ith receiver's clock bias, rcvr represents receiver, $\partial t_{sv}^j$ is the jth satellite's clock bias, sv represents space vehicle or satellite, $I_i^j$ is the ionospheric delay, $T_i^j$ is the tropospheric delay, $\epsilon_{\rho,i}^j$ and $\epsilon_{\phi,i}^j$ are respectively PR and CP measurement errors that consist of receiver noise, multipath, and antenna bias components.

$$\rho_i^j = r_i^j + \partial t_{rcvr,i} - \partial t_{sv}^j + I_i^j + T_i^j + \epsilon_{\rho,i}^j \quad \text{[Equation 1]}$$

$$\phi_i^j = r_i^j + N_i^j \lambda + \partial t_{rcvr,i} - \partial t_{sv}^j + I_i^j + T_i^j + \epsilon_{\phi,i}^j \quad \text{[Equation 2]}$$

Ionospheric delay occurs in an ionosphere. The ionosphere is a part of the upper atmosphere, comprising portions of the mesosphere, thermosphere and exosphere, distinguished because the upper atmosphere can be ionized by solar radiation. The ionosphere can play a part in atmospheric electricity and forms the inner edge of the magnetosphere and can influence radio propagation to distant places on the Earth 102. Tropospheric delay occurs in a troposphere. The troposphere can be the lowest portion of Earth's atmosphere and contain approximately 80% of the atmosphere's mass and 99% of its water vapor and aerosols. The average depth of the troposphere can be approximately 17 kilometers (km) (or 11 miles) in the middle latitudes. The troposphere can vary deeper in the tropical regions, up to 20 km (12 miles), and shallower near the poles, at 7 km (4.3 ml) in summer, and indistinct in winter.

Each CP can have carrier phase integer ambiguity. Both the satellite clock and receiver clock can have clock ambiguity.

FIG. 3 provides an example to illustrate the GPS observables to an object's attitude, such as the airplane 100, for four GPS receivers 130, 132, 134, and 136 and four GPS satellites 120, 122, 124, and 126. Two GPS receivers, a first receiver 130 and a second receiver 132, can be installed on an airplane at different known locations, $\vec{r}_1$ and $\vec{r}_2$ location, respectively. Although an airplane is shown, the method can apply to ships, vehicles, and other objects as well, as will be recognized by those skilled in the art, and thus the examples described and illustrated herein are not meant to be limiting in any way. A satellite, such as the second satellite, can broadcast a ranging signal 140, 142, 144, and 146 to each of the receivers on the airplane. A similar ranging signal can be sent by the remaining satellites in view. The jth satellite location can be represented as $\vec{r}_{sv}^j$. In the Earth-Center-Earth-Fixed (ECEF) coordinate system, a line-of-sight (LOS) unit vector $r_i^j$ can be represented by Equation 3.

$$r_i^j = |\vec{r}_{sv,ECEF}^j - \vec{r}_{i,ECEF}| \quad \text{[Equation 3]}$$

The LOS unit vector $r_i^j$ can be generated by the LOS module. A single difference observable can be generated by taking the difference between two receiver observables, represented by Equation 4 for PR, and represented by Equation 5 for CP, shown below, where a SD symbol represents a single difference observable between second receiver (receiver 2) 132 and first receiver (receiver 1) 130, and terms with a 21 subscript indicate the difference between the corresponding terms for receiver 2 and 1 (receiver 2-receiver 1). The common satellite clock bias $\partial t_{sv}^j$ drops out in SD observables.

$$SD_{\rho,21}^j = |\vec{r}_{sv,ECEF}^j - \vec{r}_{2,ECEF}| - |\vec{r}_{sv,ECEF}^j - \vec{r}_{1,ECEF}| + \delta t_{rcvr,21} + \Delta I_{21}^j + \Delta T_{21}^j + \epsilon_{\rho,21}^j \quad \text{[Equation 4]}$$

$$SD_{\phi,21}^j = |\vec{r}_{sv,ECEF}^j - \vec{r}_{2,ECEF}| - |\vec{r}_{sv,ECEF}^j - \vec{r}_{1,ECEF}| + \Delta N_{21}^j \lambda + \delta t_{rcvr,21} - \Delta I_{21}^j + \Delta T_{21}^j + \epsilon_{\phi,21}^j \quad \text{[Equation 5]}$$

The SD observables can be generated by the SD module. For a short separation distance on the order of 100 meters or less between two receivers, the difference of the first two geometric terms in Equations 4 and 5 can be approximated by first order expansion. The error in doing a first order expansion may be sub-millimeter due to satellite being about 20 million meters away, which can be negligible when compared to the measurement errors. After the first order expansion Equations 4 and 5 can be represented by Equations 6 and 7, respectively, where $\overrightarrow{LOS_{ECEF}^j}$ is the line-of-sight unit vector from receiver 1 130 to jth satellite 120, 122, 124, and 126.

$$SD_{\rho,21}^j = -\overrightarrow{LOS_{ECEF}^j} \cdot \overrightarrow{\Delta r_{21,ECEF}} + \Delta \delta t_{rcvr,21} + \Delta I_{21}^j + \Delta T_{21}^j + \Delta \epsilon_{\rho,21}^j \quad \text{[Equation 6]}$$

$$SD_{\phi,21}^j = -\overrightarrow{LOS_{ECEF}^j} \cdot \overrightarrow{\Delta r_{21,ECEF}} + \Delta N_{21}^j \lambda + \Delta \delta t_{rcvr,21} - \Delta I_{21}^j + \Delta T_{21}^j + \Delta \epsilon_{\phi,21}^j \quad \text{[Equation 7]}$$

The receiver clock bias $\partial t_{rcvr,i}$ in Equations 6 and 7 can be eliminated by forming double difference (DD) observables. DD observables can be generated by taking the difference between SD observable for a reference satellite, such as a first satellite (sv1) 120 and a jth satellite 122, 124, or 126. A satellite with a highest elevation angle can be selected as the reference satellite.

A double difference observable can be generated by taking the difference between two satellite observables from a specified receiver, represented by Equation 8 for PR, and represented by Equation 9 for CP, shown below, where terms with a 1j subscript indicate the difference between the corresponding terms for satellite 1 (sv1) 120 and satellite j 122, 124, or 126 (satellite 1-satellite j).

$$DD_{\rho,21}^{1j} = -(\overrightarrow{LOS_{ECEF}^1} - \overrightarrow{LOS_{ECEF}^j}) \cdot \overrightarrow{\Delta r_{21,ECEF}} + \Delta I_{21}^{1j} + \Delta T_{21}^{1j} + \Delta \epsilon_{\rho,21}^{1j} \quad \text{[Equation 8]}$$

$$DD_{\phi,21}^{1j} = -(\overrightarrow{LOS_{ECEF}^1} - \overrightarrow{LOS_{ECEF}^j}) \cdot \overrightarrow{\Delta r_{21,ECEF}} + \Delta N_{21}^{1j} \lambda - \Delta I_{21}^{1j} + \Delta T_{21}^{1j} + \Delta \epsilon_{\phi,21}^{1j} \quad \text{[Equation 9]}$$

The DD observables can be generated by the DD module. To simplify the Equations 8 and 9, the errors can be represented by Equation 10 for PR, and represented by Equation 11 for CP, where $\Delta I_{21}^{1j}$, $\Delta T_{21}^{1j}$, $\Delta \epsilon_{\rho,i}^j$, and $\Delta \epsilon_{\phi,i}^j$ are called differential ionospheric errors, tropospheric errors, differential PR measurement errors, and differential CP measurement errors, respectively.

$$\Delta \Sigma_{\rho,21}^{1j} = \Delta I_{21}^{1j} + \Delta T_{21}^{1j} + \Delta \epsilon_{\rho,21}^{1j} \quad \text{[Equation 10]}$$

$$\Delta \Sigma_{\phi,21}^{1j} = -\Delta I_{21}^{1j} + \Delta T_{21}^{1j} + \Delta \epsilon_{\phi,21}^{1j} \quad \text{[Equation 11]}$$

$\overrightarrow{\Delta r_{21,ECEF}}$ can be related to an accurately surveyed vector $\overrightarrow{\Delta r_{21,bdy}}$ (or known vector) in the object's body fixed frame (or airplane body fixed frame) and represented by Equation 12, where $C_{enu2ecef}$, $C_{ned2enu}$ and $C_{bdy2ned}$ are the rotational matrices that convert a position vector between two coordinate frames (ENU=East-North-Up, NED=North-East-Down, and BDY=body fixed), and $$C_{ned2enu} = \begin{bmatrix} 0 & 1 & 0 \\ 1 & 0 & 0 \\ 0 & 0 & -1 \end{bmatrix}$$

$$C_{bdy2ned} = Y \cdot P \cdot R$$

$$R = \begin{bmatrix} 1 & 0 & 0 \\ 0 & \cos(r) & -\sin(r) \\ 0 & \sin(r) & \cos(r) \end{bmatrix}$$

$$P = \begin{bmatrix} \cos(p) & 0 & \sin(p) \\ 0 & 1 & 0 \\ -\sin(p) & 0 & \cos(p) \end{bmatrix}$$

$$Y = \begin{bmatrix} \cos(y) & -\sin(y) & 0 \\ \sin(y) & \cos(y) & 0 \\ 0 & 0 & 1 \end{bmatrix}$$

where r, p, and y are roll, pitch, and yaw angles, respectively.

$$\overrightarrow{\Delta r_{21,ECEF}} = C_{enu2ecef} \cdot C_{ned2enu} \cdot C_{bdy2ned} \cdot \overrightarrow{\Delta r_{21,bdy}} \quad \text{[Equation 12]}$$

Equations to compute $C_{enu2ecef}$ at a known latitude and longitude location will be apparent to those skilled in the art. Equations 8 and 9 can be rewritten as Equations 13 and 14, respectively.

$$DD_{\rho,21}{}^{1j} = -(\overrightarrow{LOS_{ECEF}^1} - \overrightarrow{LOS_{ECEF}^j}) \cdot C_{enu2ecef} \cdot C_{ned2enu} \cdot C_{bdy2ned} \cdot \overrightarrow{\Delta r_{21,bdy}} + \Delta\Sigma_{\rho,21}{}^{1j} \quad \text{[Equation 13]}$$

$$DD_{\phi,21}{}^{1j} = -(\overrightarrow{LOS_{ECEF}^1} - \overrightarrow{LOS_{ECEF}^j}) \cdot C_{enu2ecef} \cdot C_{ned2enu} \cdot C_{bdy2ned} \cdot \overrightarrow{\Delta r_{21,bdy}} + \Delta N_{21}{}^{1j}\lambda + \Delta\Sigma_{\phi,21}{}^{1j} \quad \text{[Equation 14]}$$

Since the GPS and INS processor can already determine roll, pitch, and yaw angles to a pretty good accuracy, the expected first (geometric) term in Equations 13 and 14 can be computed using the available rough estimates of roll, pitch, and yaw and latitude and longitude from the GPS and INS processor. Double difference residuals can be generated by subtracting the expected first term from Equations 13 and 14, which can be represented by Equations 15 and 16, where $C_{bdy2ned,0}$ is the body-to-NED coordinate transformation matrix when using the rough estimates of roll, pitch, and yaw angles from GPS/INS processing.

$$DD_{\rho,21,res}{}^{1j} = -(\overrightarrow{LOS_{ECEF}^1} - \overrightarrow{LOS_{ECEF}^j}) \cdot C_{enu2ecef} \cdot C_{ned2enu} \cdot (C_{bdy2ned} - C_{bdy2ned,0}) \cdot \overrightarrow{\Delta r_{21,bdy}} + \Delta\Sigma_{\rho,21}{}^{1j} \quad \text{[Equation 15]}$$

$$DD_{\phi,21,res}{}^{1j} = -(\overrightarrow{LOS_{ECEF}^1} - \overrightarrow{LOS_{ECEF}^j}) \cdot C_{enu2ecef} \cdot C_{ned2enu} \cdot (C_{bdy2ned} - C_{bdy2ned,0}) \cdot \overrightarrow{\Delta r_{21,bdy}} + \Delta N_{21}{}^{1j}\lambda + \Delta\Sigma_{\phi,21}{}^{1j} \quad \text{[Equation 16]}$$

Taking the first order approximation of $C_{bdy2ned} - C_{bdy2ned,0}$, Equations 15 and 16 can be rewritten as Equations 17 and 18 where $\Delta r$, $\Delta p$, and $\Delta y$ are attitude corrections to the current rough attitude estimates, and observation matrix (or satellite observation matrix) $G_{21}{}^j$ for two receivers (where one receiver is a reference satellite) and two satellites (where one satellite is a reference satellite) is given by Equation 19.

$$DD_{\rho,21,res}^{1j} = G_{21}^j \cdot \begin{pmatrix} \Delta r \\ \Delta p \\ \Delta y \end{pmatrix} + \Delta\Sigma_{\rho,21}^{1j} \quad \text{[Equation 17]}$$

$$DD_{\phi,21,res}^{1j} = G_{21}^j \cdot \begin{pmatrix} \Delta r \\ \Delta p \\ \Delta y \end{pmatrix} + \Delta N_{21}^{1j}\lambda + \Delta\Sigma_{\phi,21}^{1j} \quad \text{[Equation 18]}$$

$$G_{21}^j = -\left(\overrightarrow{LOS_{ECEF}^1} - \overrightarrow{LOS_{ECEF}^j}\right) \cdot C_{enu2ecef} \cdot C_{ned2enu} \cdot \left(Y \cdot P\left(\frac{dR}{dp}\right) \quad Y\left(\frac{dP}{dp}\right)R \quad \left(\frac{dY}{dy}\right)P \cdot R\right) \cdot \overrightarrow{\Delta r_{21,bdy}} \quad \text{[Equation 19]}$$

Equation 17 and 18 can be used to generate a multiple dimensional state vector by the DGPS processor. The DD residuals can be used to provide an airplane's attitude corrections, instead of a baseline vector correction. The DD measurements can be solved simultaneously in a DD measurement vector y.

In this example, the multiple dimensional state vector x can be generated from the DD measurement vector y for n GPS satellites in view and four GPS receivers using an observation matrix H, where the relationship between the multiple dimensional state vector and the DD measurements is represented by Equation 20 and $\epsilon$ represents the DD measurement error.

$$y = Hx + \epsilon \quad \text{[Equation 20]}$$

The DD measurement vector y is a 6(n−1)×1 column vector of measurements (shown below), H is a 6(n−1)×3n observation matrix (shown below), x is a 3n×1 column vector of states (shown below), and s is a 6(n−1)×1 column vector of measurement errors, where n is the number of common satellites in view to each receiver, $G^{i,1}$ is a receiver pair observation matrix with $G_{ij}{}^j$ satellite observation matrices of an jth GPS satellite relative to a reference GPS satellite where j represents GPS satellite 2 to n (shown below), k is a positive integer representing receiver 2 to 4, A is an identity matrix, and $\delta\Theta$ is an angle correction vector for changes to a set of roll ($\Delta r$), pitch ($\Delta p$), and yaw ($\Delta y$) angles (shown below). DD are the double difference measurements (n−1 for n satellites in view), $\rho$,NL represents the narrow lane combination of PR measurements $(\rho 1+\rho 2)/2$, $\phi$,f represents the CP measurement where f is the phase combination used, such as wide lane, single frequency, or narrow lane. Commonly, f would be wide lane ($\phi 1-\phi 2$ with $\lambda \sim 86.19$ cm), single frequency ($\phi 1$ with $\lambda \sim 19.03$ cm or $\phi 2$ with $\lambda \sim 24.42$ cm), or narrow lane ($\phi 1+\phi 2$ with $\lambda \sim 10.70$ cm). $G_{k1}{}^j(1,3)$ is the "G" 3×1 row vector defined by Equation 19. The appended (a, b) represents the size of the vector or matrix (a rows, b columns). If no size is appended (to variables on the right side of the equation, then the variable is a scalar (i.e., 1×1).

$$y = \begin{bmatrix} DD_{\phi,f}^{2,1}(n-1,1) \\ DD_{\rho,NL}^{2,1}(n-1,1) \\ DD_{\phi,f}^{3,1}(n-1,1) \\ DD_{\rho,NL}^{3,1}(n-1,1) \\ DD_{\phi,f}^{4,1}(n-1,1) \\ DD_{\rho,NL}^{4,1}(n-1,1) \end{bmatrix},$$

$$H = \begin{bmatrix} G^{2,1}(n-1,3) & A(n-1,n-1) & 0(n-1,n-1) & 0(n-1,n-1) \\ G^{2,1}(n-1,3) & 0(n-1,n-1) & 0(n-1,n-1) & 0(n-1,n-1) \\ G^{3,1}(n-1,3) & 0(n-1,n-1) & A(n-1,n-1) & 0(n-1,n-1) \\ G^{3,1}(n-1,3) & 0(n-1,n-1) & 0(n-1,n-1) & 0(n-1,n-1) \\ G^{4,1}(n-1,3) & 0(n-1,n-1) & 0(n-1,n-1) & A(n-1,n-1) \\ G^{4,1}(n-1,3) & 0(n-1,n-1) & 0(n-1,n-1) & 0(n-1,n-1) \end{bmatrix},$$

$$x = \begin{bmatrix} \delta\Theta(3,1) \\ N_f^{2,1}(n-1,1) \\ N_f^{3,1}(n-1,1) \\ N_f^{4,1}(n-1,1) \end{bmatrix}, \quad G^{k,1}(n-1,3) = \begin{bmatrix} G_{k1}^2(1,3) \\ G_{k1}^3(1,3) \\ \vdots \\ G_{k1}^n(1,3) \end{bmatrix}, \quad \delta\Theta = \begin{bmatrix} \Delta r \\ \Delta p \\ \Delta y \end{bmatrix}$$

In this example, four receivers are assumed in the formulation, but the method can work for any number of receivers greater than three, and the equations can be modified accordingly.

Attitude determination as part of CP integer ambiguity resolution can use the GERAFS processing described in U.S. Pat. No. 7,768,451 to Wu et al.

Figure 4:
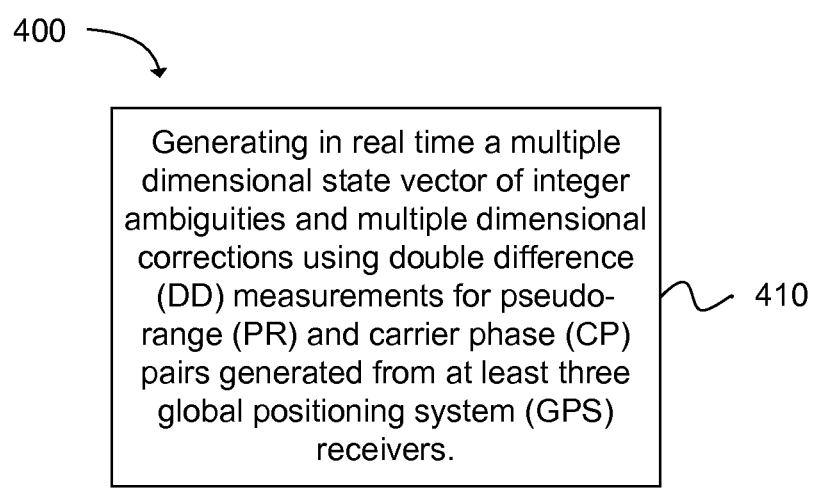
FIG. 4 depicts a flow chart of a method for determining attitude data in real time in accordance with an example of the present invention.

Another example provides a method 400 for determining attitude data in real time, as shown in the flow chart in FIG. 4. The method includes generating in real time a multiple dimensional state vector of integer ambiguities and multiple dimensional corrections using double difference (DD) measurements for pseudo-range (PR) and carrier phase (CP) pairs generated from at least three global positioning system (GPS) receivers, as in block 710.

Prior to generating in real time a multiple dimensional state vector, the operation of receiving GPS data and GPS-aided navigation data for at least three GPS receivers can be performed. The GPS-aided navigation data combines GPS data of each GPS receiver with inertial measurement unit (IMU) data. The operation of selecting observable GPS data from the GPS data and the GPS-aided navigation data follows. The next operation of the method may be generating a line-of-sight (LOS) unit vector for each GPS receiver from the observable GPS data for GPS satellites in view of the GPS receivers. The operation of generating at least two single difference (SD) observables, wherein a single difference observable is the difference between two receiver observables follows. A receiver observable can include observable GPS data or a LOS unit vector for each receiver. The method further includes generating at least two double difference (DD) observables. A double difference observable can be the difference between SD observables of two GPS satellites.

After generating the multiple dimensional state vector, the operation of generating an attitude from the multiple dimensional state vector can be performed.

The relationship between the multiple dimensional state vector and the double difference (DD) measurements can be represented generally by y=Hx+ε, where y is a DD measurement vector for n GPS satellites in view and m GPS receivers, H is an observation matrix, x is the multiple dimensional state vector, and ε represents the DD measurement error, represented by $$y = \begin{bmatrix} DD_{\phi,f}^{2,1}(n-1,1) \\ DD_{\rho,NL}^{2,1}(n-1,1) \\ \vdots \\ DD_{\phi,f}^{m,1}(n-1,1) \\ DD_{\rho,NL}^{m,1}(n-1,1) \end{bmatrix},$$

$$H = \begin{bmatrix} G^{2,1}(n-1,3) & A(n-1,n-1) & \ldots & 0(n-1,n-1) \\ G^{2,1}(n-1,3) & 0(n-1,n-1) & \ldots & 0(n-1,n-1) \\ \vdots & \vdots & \ddots & \vdots \\ G^{m,1}(n-1,3) & 0(n-1,n-1) & \ldots & A(n-1,n-1) \\ G^{m,1}(n-1,3) & 0(n-1,n-1) & \ldots & 0(n-1,n-1) \end{bmatrix},$$

where ρ

$$x = \begin{bmatrix} \delta\Theta(3,1) \\ N_f^{2,1}(n-1,1) \\ \vdots \\ N_f^{m,1}(n-1,1) \end{bmatrix}, G^{i,1}(n-1,3) = \begin{bmatrix} G_{i1}^2(1,3) \\ \vdots \\ G_{i1}^m(1,3) \end{bmatrix}, \delta\Theta = \begin{bmatrix} \Delta r \\ \Delta p \\ \Delta y \end{bmatrix}$$

represents the PR measurements, φ represents the CP measurements, $DD^{i,1}$ is a receiver pair DD measurement vector with DD measurements of an ith GPS receiver relative to a reference GPS receiver where i represents GPS receiver 2 to m where m is a positive integer, where the appended (a, b) represents the size of the vector or matrix (a rows, b columns) where a and b are positive integers, ρ,NL represents the narrow lane combination of PR measurements $(\rho_1+\rho_2)/2$ where $\rho_1$ is a first PR measurement and $\rho_2$ is a second PR measurement from one GPS satellite in view to one GPS receiver, φ,f represents a phase combination of CP measurement where f frequency is selected from the group of wide-lane $(\phi_1-\phi_2)$ frequency, single frequency $(\phi_1$ or $\phi_2)$, and narrow lane frequency $(\phi_1+\phi_2)$, where $\phi_1$ is a first CP measurement and $\phi_2$ is a second CP measurement from one GPS satellite in view to one GPS receiver, $G^{i,1}$ is a receiver pair observation matrix with $G_{i1}^j$ satellite observation matrices of an jth GPS satellite relative to a reference GPS satellite where j represents GPS satellite 2 to n where n is a positive integer, A is an identity matrix, and δΘ is an angle correction vector for changes to a set of roll (Δr), pitch (Δp), and yaw (Δy) angles.

The $G_{i1}^j$ satellite observation matrix can be represented by $$G_{i1}^j = \left(\overrightarrow{LOS_{ECEF}^1} - \overrightarrow{LOS_{ECEF}^j}\right) \cdot C_{enu2ecef} \cdot$$

$$C_{ned2enu} \cdot \left(Y \cdot P\left(\frac{dR}{dr}\right) \quad Y\left(\frac{dP}{dp}\right)R \quad \left(\frac{dY}{dy}\right)P \cdot R\right) \cdot \overrightarrow{\Delta r_{i1,bdy}},$$

where $\overrightarrow{LOS_{ECEF}^1}$ is the line-of-sight (LOS) unit vector to the reference GPS receiver and $\overrightarrow{LOS_{ECEF}^j}$ is the LOS unit vector from the reference GPS receiver to the jth GPS satellite in a Earth-Center-Earth-Fixed (ECEF) coordinate system, $C_{enu2ecef}$ is an East-North-Up (ENU) rotational matrix that converts a position vector between an ENU coordinate frame and an ECEF coordinate frame for a known latitude and longitude location, $C_{ned2enu}$ is a North-East-Down (NED) rotational matrix that converts a position vector between a NED coordinate frame and the ECEF coordinate frame, Y is a yaw position matrix for the roll angle r, the pitch angle p, and the yaw angle y, P is a pitch position matrix, R is a roll position matrix, represented by $$C_{ned2enu} = \begin{bmatrix} 0 & 1 & 0 \\ 1 & 0 & 0 \\ 0 & 0 & -1 \end{bmatrix}, C_{bdy2ned} = Y \cdot P \cdot R,$$

$\overrightarrow{\Delta r_{i1,bdy}}$ is $$R = \begin{bmatrix} 1 & 0 & 0 \\ 0 & \cos(r) & -\sin(r) \\ 0 & \sin(r) & \cos(r) \end{bmatrix}, P = \begin{bmatrix} \cos(p) & 0 & \sin(p) \\ 0 & 1 & 0 \\ -\sin(p) & 0 & \cos(p) \end{bmatrix},$$

$$Y = \begin{bmatrix} \cos(y) & -\sin(y) & 0 \\ \sin(y) & \cos(y) & 0 \\ 0 & 0 & 1 \end{bmatrix},$$

a differential surveyed object body vector from the reference GPS receiver to the ith GPS receiver.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defecate equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A differential global positioning system (DGPS) processor, comprising:
   an almost fixed integer ambiguity (AFIA) module configured to generate, in real-time, a multiple dimensional state vector of integer ambiguities and multiple dimensional corrections using double difference (DD) measurements for pseudo-range (PR) and carrier phase (CP) pairs generated from at least three global positioning system (GPS) receivers, wherein, to generate the multiple dimensional state vector, the AFIA module is operative to (i) determine a difference between a double difference (DD) measurement error and a DD measurement vector for a defined number of GPS satellites in view and at least three GPS receivers, and (ii) divide the difference by an observation matrix for the PR and CP pairs, wherein the AFIA module is stored in a digital memory device or is implemented in a hardware circuit;
   an attitude module configured to generate an attitude from the multiple dimensional state vector of integer ambiguities and multiple dimensional corrections, wherein the attitude module is stored in a digital memory device or is implemented in a hardware circuit;
   a single difference (SD) module configured to generate at least two single difference observables, wherein a single difference observable is the difference between two receiver observables, wherein a receiver observable includes observable GPS data or a LOS unit vector for each receiver, wherein the SD module is stored in a digital memory device or is implemented in a hardware circuit; and
   a DD module configured to generate at least two double difference observables, wherein a double difference observable is the difference between SD observables of two GPS satellites, wherein the DD module is stored in a digital memory device or is implemented in a hardware circuit, wherein a number of single difference observables or a number of double difference observables is less than a number of GPS receivers used to generate observable GPS data.

2. The DGPS processor of claim 1, wherein the multiple dimensional corrections are angle corrections for a set of roll, pitch, and/or yaw angles.

3. The DGPS processor of claim 1, wherein the GPS receivers are rigidly fixed in known positions relative to each other.

4. The DGPS processor of claim 1, further comprising:
a data selection module configured to receive GPS data and GPS-aided navigation data and selecting observable GPS data for at least three GPS receivers, wherein the GPS-aided navigation data combines GPS data of each GPS receiver with inertial measurement unit (IMU) data; and
a line-of-sight (LOS) module configured to generate a LOS unit vector for each GPS receiver from the observable GPS data for GPS satellites in view of the GPS receivers.

5. The DGPS processor of claim 1, wherein the AFIA module is configured to generate a multiple dimensional observation matrix for at least two PR and CP measurement pairs.

6. The DGPS processor of claim 1, wherein the double difference measurements is configured to utilize a CP measurement for carrier frequency selected from the group consisting of a single frequency and a narrow-lane (NL) frequency, where NL frequency sums at least two CPs measurements together.

7. A method for determining attitude data in real time, comprising:
under control of one or more computer systems configured with executable instructions:
generating, using one or more processors of the computer systems, in real time a multiple dimensional state vector of integer ambiguities and multiple dimensional corrections using double difference (DD) measurements for pseudo-range (PR) and carrier phase (CP) pairs generated from at least three global positioning system (GPS) receivers, wherein the multiple dimensional state vector is generated by: (i) determining a difference between a double difference (DD) measurement error and a DD measurement vector for a defined number of GPS satellites in view and at least three GPS receivers, and (ii) dividing the difference by an observation matrix for the PR and CP pairs;
generating, using the one or more processors of the computer systems, an attitude from the multiple dimensional state vector of integer ambiguities and multiple dimensional corrections;
generating at least two single difference (SD) observables, wherein a single difference observable is the difference between two receiver observables, wherein a receiver observable includes at least one of observable GPS data and a LOS unit vector for each receiver; and
generating at least two double difference (DD) observables, wherein a double difference observable is the difference between SD observables of two GPS satellites, wherein a number of single difference observables or a number of double difference observables is less than a number of GPS receivers used to generate observable GPS data.

8. The method of claim 7, further comprising, prior to generating the multiple dimensional state vector:
receiving GPS data and GPS-aided navigation data for at least three GPS receivers, wherein the GPS-aided navigation data combines GPS data of each GPS receiver with inertial measurement unit (IMU) data;
selecting observable GPS data from the GPS data and the GPS-aided navigation data; and
generating a line-of-sight (LOS) unit vector for each GPS receiver from the observable GPS data for GPS satellites in view of the GPS receivers.

9. The method of claim 7, wherein the relationship between the multiple dimensional state vector and the double difference (DD) measurements is represented by $y=Hx+\epsilon$, where y is a DD measurement vector for n GPS satellites in view and m GPS receivers, H is an observation matrix, x is the multiple dimensional state vector, and $\epsilon$ represents the DD measurement error, represented by $$y = \begin{bmatrix} DD_{\phi,f}^{2,1}(n-1,1) \\ DD_{\rho,NL}^{2,1}(n-1,1) \\ \vdots \\ DD_{\phi,f}^{m,1}(n-1,1) \\ DD_{\rho,NL}^{m,1}(n-1,1) \end{bmatrix},$$

$$H = \begin{bmatrix} G^{2,1}(n-1,3) & A(n-1,n-1) & \ldots & 0(n-1,n-1) \\ G^{2,1}(n-1,3) & 0(n-1,n-1) & \ldots & 0(n-1,n-1) \\ \vdots & \vdots & \ddots & \vdots \\ G^{m,1}(n-1,3) & 0(n-1,n-1) & \ldots & A(n-1,n-1) \\ G^{m,1}(n-1,3) & 0(n-1,n-1) & \ldots & 0(n-1,n-1) \end{bmatrix},$$

where $\rho$ $$x = \begin{bmatrix} \delta\Theta(3,1) \\ N_f^{2,1}(n-1,1) \\ \vdots \\ N_f^{m,1}(n-1,1) \end{bmatrix}, \ G^{i,1}(n-1,3) = \begin{bmatrix} G_{ii}^2(1,3) \\ \vdots \\ G_{ii}^m(1,3) \end{bmatrix}, \ \delta\Theta = \begin{bmatrix} \Delta r \\ \Delta p \\ \Delta y \end{bmatrix}$$

represents the PR measurements, $\phi$ represents the CP measurements, $DD^{i,1}$ is a receiver pair DD measurement vector with DD measurements of an ith GPS receiver relative to a reference GPS receiver where i represents GPS receiver 2 to m where m is a positive integer, where the appended (a, b) represents the size of the vector or matrix (a rows, b columns) where a and b are positive integers, $\rho$,NL represents the narrow lane combination of PR measurements $(\rho_1+\rho_2)/2$ where $\rho_i$ is a first PR measurement and $\rho_2$ is a second PR measurement from one GPS satellite in view to one GPS receiver, $\phi$,f represents a phase combination of CP measurement where f frequency is selected from the group of wide-lane $(\phi_1-\phi_2)$ frequency, single frequency ($\phi_1$ or $\phi_2$), and narrow lane frequency $(\phi_1+\phi_2)$, where $\phi_1$ is a first CP measurement and $\phi_2$ is a second CP measurement from one GPS satellite in view to one GPS receiver, $G^{i,1}$ is a receiver pair observation matrix with $G_{ii}^j$ satellite observation matrices of an jth GPS satellite relative to a reference GPS satellite where j represents GPS satellite 2 to n where n is a positive integer, A is an identity matrix, and δΘ is an angle correction vector for changes to a set of roll (Δr), pitch (Δp), and yaw (Δy) angles.

10. The method of claim 9, wherein the $G_{i1}^j$ satellite observation matrix is represented by $$G_{i1}^j = -(\overrightarrow{LOS_{ECEF}^1} - \overrightarrow{LOS_{ECEF}^j}) \cdot C_{enu2ecef} \cdot$$

$$C_{ned2enu} \cdot \left( Y \cdot P\left(\frac{dR}{dr}\right) \quad Y\left(\frac{dP}{dp}\right)R \quad \left(\frac{dY}{dy}\right)P \cdot R \right) \cdot \overrightarrow{\Delta r_{i1,bdy}},$$

where $\overrightarrow{LOS_{ECEF}^1}$ is the line-of-sight (LOS) unit vector to the reference GPS receiver and $\overrightarrow{LOS_{ECEF}^j}$ is the LOS unit vector from the reference GPS receiver to the jth GPS satellite in a Earth-Center-Earth-Fixed (ECEF) coordinate system, $C_{enu2ecef}$ is an East-North-Up (ENU) rotational matrix that converts a position vector between an ENU coordinate frame and an ECEF coordinate frame for a known latitude and longitude location, $C_{ned2enu}$ is a North-East-Down (NED) rotational matrix that converts a position vector between a NED coordinate frame and the ECEF coordinate frame, Y is a yaw position matrix for the roll angle r, the pitch angle p, and the yaw angle y, P is a pitch position matrix, R is a roll position matrix, represented by $$C_{ned2enu} = \begin{bmatrix} 0 & 1 & 0 \\ 1 & 0 & 0 \\ 0 & 0 & -1 \end{bmatrix}, C_{bdy2ned} = Y \cdot P \cdot R,$$

$$R = \begin{bmatrix} 1 & 0 & 0 \\ 0 & \cos(r) & -\sin(r) \\ 0 & \sin(r) & \cos(r) \end{bmatrix}, P = \begin{bmatrix} \cos(p) & 0 & \sin(p) \\ 0 & 1 & 0 \\ -\sin(p) & 0 & \cos(p) \end{bmatrix},$$

$$Y = \begin{bmatrix} \cos(y) & -\sin(y) & 0 \\ \sin(y) & \cos(y) & 0 \\ 0 & 0 & 1 \end{bmatrix},$$

$\Delta r_{i1,bdy}$ is a differential surveyed object body vector from the reference GPS receiver to the ith GPS receiver.

11. A computer program product, comprising a computer usable medium having a computer readable program code embodied therein, the computer readable program code adapted to be executed to implement the method of claim 7.

12. A system for facilitating real time attitude determination (RTAD), comprising:
a processor;
a memory device including a data store to store a plurality of data and instructions that, when executed by the processor, cause the processor to:
generate in real time periodic attitude data from global positioning system (GPS) receiver data or GPS-aided navigation data using a multiple dimensional state vector of integer ambiguities and multiple dimensional corrections, wherein, to generate the multiple dimensional state vector, the processor is operative to: (i) determine a difference between a double difference (DD) measurement error and a DD measurement vector for a defined number of GPS satellites in view and at least three GPS receivers, and (ii) divide the difference by an observation matrix for at least two pairs of double difference (DD) pseudo-range (PR) and carrier phase (CP) measurements;
generate at least two single difference (SD) observables, wherein a single difference observable is the difference between two receiver observables, wherein a receiver observable includes at least one of observable GPS data and a LOS unit vector for each receiver;
generate at least two double difference (DD) observables, wherein a double difference observable is the difference between SD observables of two GPS satellites,
wherein a number of single difference observables or a number of double difference observables is less than a number of GPS receivers used to generate observable GPS data,
wherein the GPS receiver data is generated from at least three GPS receivers and the GPS-aided navigation data combines GPS data of each GPS receiver with inertial measurement unit (IMU) data.

13. The system of claim 12, further comprising:
a heading update filter estimator configured to generate a real time attitude determination (RTAD) by combining periodic attitude data of the DGPS processor with inertial measurement unit (IMU) data, wherein the inertial measurement unit (IMU) data is used to maintain continuity of an attitude between sampling of the periodic attitude data.

14. The system of claim 13, wherein the heading update filter estimator further comprises:
a two state heading filter configured to correct an average heading from a low authority inertial filter (LAIF) of an inertial measurement unit with the periodic attitude data and generating a two state heading filter output; and
a multiplexer configured to combine the two state heading filter output with the GPS-aided navigation data from a full inertial filter (FIF) of the inertial measurement unit.

15. The system of claim 13, further comprising:
a standard GPS and inertial navigation system (INS) processor configured to generate the GPS-aided navigation data using a full inertial filter (FIF) to combine GPS sensor data with inertial measurement unit (IMU) data for a continuous heading; and
a minimally aided GPS and INS processor configured to generate an average heading using a low authority inertial filter (LAIF) to combine GPS sensor data with inertial measurement unit (IMU) data.

16. The system of claim 12, further comprising:
a PR smoothing processor configured to smooth PR measurements of GPS raw receiver data with the CP measurements to generate the GPS receiver data by estimating a CP bias for a smoothing interval and adding the CP bias to the CP to generate a smoothed unbiased measurement, wherein a bias measurement has measurement ambiguity and an unbiased measurement is an absolute measurement.

17. The system of claim 16, wherein the PR smoothing processor is selected from the group consisting of a single frequency smoothing processor, an iono-free smoothing processor, a divergence free smoothing processor, and combinations thereof.

* * * * *